US005944601A

United States Patent [19]

Hayashi et al.

[11] Patent Number: 5,944,601

[45] Date of Patent: Aug. 31, 1999

[54] COIN PROCESSING DEVICE WITH ADAPTIVE STORAGE

[75] Inventors: Takahiro Hayashi, Kitamoto; Yoshikazu Mori, Iruma-gun; Mitsugu Mikami, Kawagoe, all of Japan

[73] Assignee: Kabushiki Kaisha Nippon Conlux, Tokyo, Japan

[21] Appl. No.: 09/227,268

[22] Filed: Jan. 8, 1999

Related U.S. Application Data

[62] Division of application No. 09/140,780, Aug. 27, 1998.

[30] Foreign Application Priority Data

| | | | |
|---|---|---|---|
| Aug. 29, 1997 | [JP] | Japan | 9-234579 |
| Sep. 4, 1997 | [JP] | Japan | 9-239706 |

[51] Int. Cl.[6] .............................. G07D 9/06; B65G 57/03

[52] U.S. Cl. .............................. 453/61; 221/24

[58] Field of Search .............................. 221/24; 453/61, 453/62, 63; 194/238

[56] References Cited

U.S. PATENT DOCUMENTS

| | | | |
|---|---|---|---|
| 1,020,397 | 3/1912 | Bourck | 453/61 |
| 4,221,227 | 9/1980 | Heiman | 133/3 D |
| 4,367,760 | 1/1983 | Thomas | 133/4 A |
| 4,374,529 | 2/1983 | Kobayashi et al. | 133/4 A |
| 4,607,650 | 8/1986 | Kobayashi et al. | 133/5 R |
| 5,011,456 | 4/1991 | Kobayashi et al. | 453/32 |
| 5,159,156 | 10/1992 | Munk et al. . | |
| 5,333,733 | 8/1994 | Murata . | |
| 5,400,891 | 3/1995 | Winstanley | 194/350 |
| 5,810,192 | 9/1998 | Cruz . | |
| 5,827,117 | 10/1998 | Naas | 453/61 |

FOREIGN PATENT DOCUMENTS

| | | | |
|---|---|---|---|
| WO9416411 | 7/1994 | WIPO | G07D 1/00 |

*Primary Examiner*—Christopher P. Ellis
*Assistant Examiner*—Bryan Jaketic
*Attorney, Agent, or Firm*—Loeb & Loeb LLP

[57] ABSTRACT

In a coin processing device in accordance with the first aspect of the present invention, coin storage means (4) comprises a plurality of coin tubes (10, 11, 12, 13) which are separately formed, and linking means (30) which is formed for each one of the coin tubes (10, 11, 12, 13) and inter-links adjacent coin tubes. In a coin processing device in accordance with the second aspect of the present invention, coin storage means (64) comprises integrated type coin tubes (74) where a plurality of coin tubes are integrated into one unit, and adapter tubes (80, 81, 82) which are inserted in each one of the plurality of coin tubes (71, 72, 73) for changing the internal diameters thereof.

12 Claims, 15 Drawing Sheets

COIN PROCESSING DEVICE WITH ADAPTIVE STORAGE

This is a division of application Ser. No. 09/140,780 filed Aug. 27, 1998, which application is hereby incorporated by reference in its entirety.

BACKGROUND OF THE INVENTION

1. Field of the Invention

The present invention relates to a coin processing device that judges the genuineness of entered coins, stores genuine coins separately for each denomination, and pays out coins according to the amount of change.

2. Description of the Related Art

Generally, an automatic vending machine, a money changing machine and various types of service devices have a coin processing device that judges the genuineness of entered coins, selects and stores only genuine coins separately for each denomination, and pays out the stored coins according to the amount of the change.

The coin processing device of this type comprises the following three components.

The first component is coin selecting means for judging the genuineness of entered coins, and sorts out the coins into genuine coins from counterfeit coins.

The second component is coin storage means disposed below the coin selecting means, for storing selected genuine coins. So called integrated type coin tubes are used for the coin storage means in which a plurality of coin tubes whose internal diameters are different from one another are integrately formed, into which selected genuine coins are loaded separately for each denomination.

The third component is change payment means disposed below the coin storage means, for paying out the coins from the integrated type coin tubes of the coin storage means according to the amount of change.

Each of the above components is mounted in the device main body.

When a coin processing device that has the above described components is used in different countries, it must match with the feature of the coins being used in respective countries, especially, external diameters of the coins being used. Therefore, in a conventional coin storage device which uses integrated type coin tubes each having different internal diameters, it is necessary to match the internal diameters of these coin tubes with the external diameters of the currency of the country in which the coin processing device is installed.

So, in order to manufacture such a coin processing device operable in each country, it is necessary to manufacture the integrated type coin tubes for each country, which have internal diameters matched with the currency of each country, which has increased the manufacturing cost of the coin processing device.

Further, if the diameter of a coin in use changes in a country, a new integrated type coin tubes which include an internal diameter corresponding to the changed diameter of the coin must be manufactured, which has also increased the manufacturing cost of the coin processing device.

SUMMARY OF THE INVENTION

An object of the present invention is to provide a coin processing device that can store various type of coins without manufacturing integrated type coin tubes corresponding to various types of coins.

To achieve the above objective, a coin processing device in accordance with the first aspect of the present invention comprises coin selecting means for judging genuineness of coins which have been entered therein and sorting out the entered coins into genuine coins from counterfeit coins; coin storage means for storing separately for each denomination the genuine coins selected by the coin selecting means; and change payment means for paying out coins according to the amount of change from the coin storage means, wherein the coin storage means comprises a plurality of coin tubes which are formed separately; and linking means which is provided for each one of the coin tubes for inter-linking the adjacent coin tubes.

In a coin processing device in accordance with the second aspect of the present invention, the coin storage means comprises integrated type coin tubes in which a plurality of coin tubes are integrated into one unit; and adapter tubes each comprising a tube body which is inserted in the plurality of coin tubes, for changing internal diameters of the coin tubes.

Other objects and the effect of the present invention can easily be seen in the following detailed description and the accompanying drawings.

DESCRIPTION OF THE PREFERRED EMBODIMENTS

Embodiments of a coin processing device in accordance with the first aspect of the present invention, and embodiments of a coin processing device in accordance with the second aspect of the present invention are described below.

Figure 1:
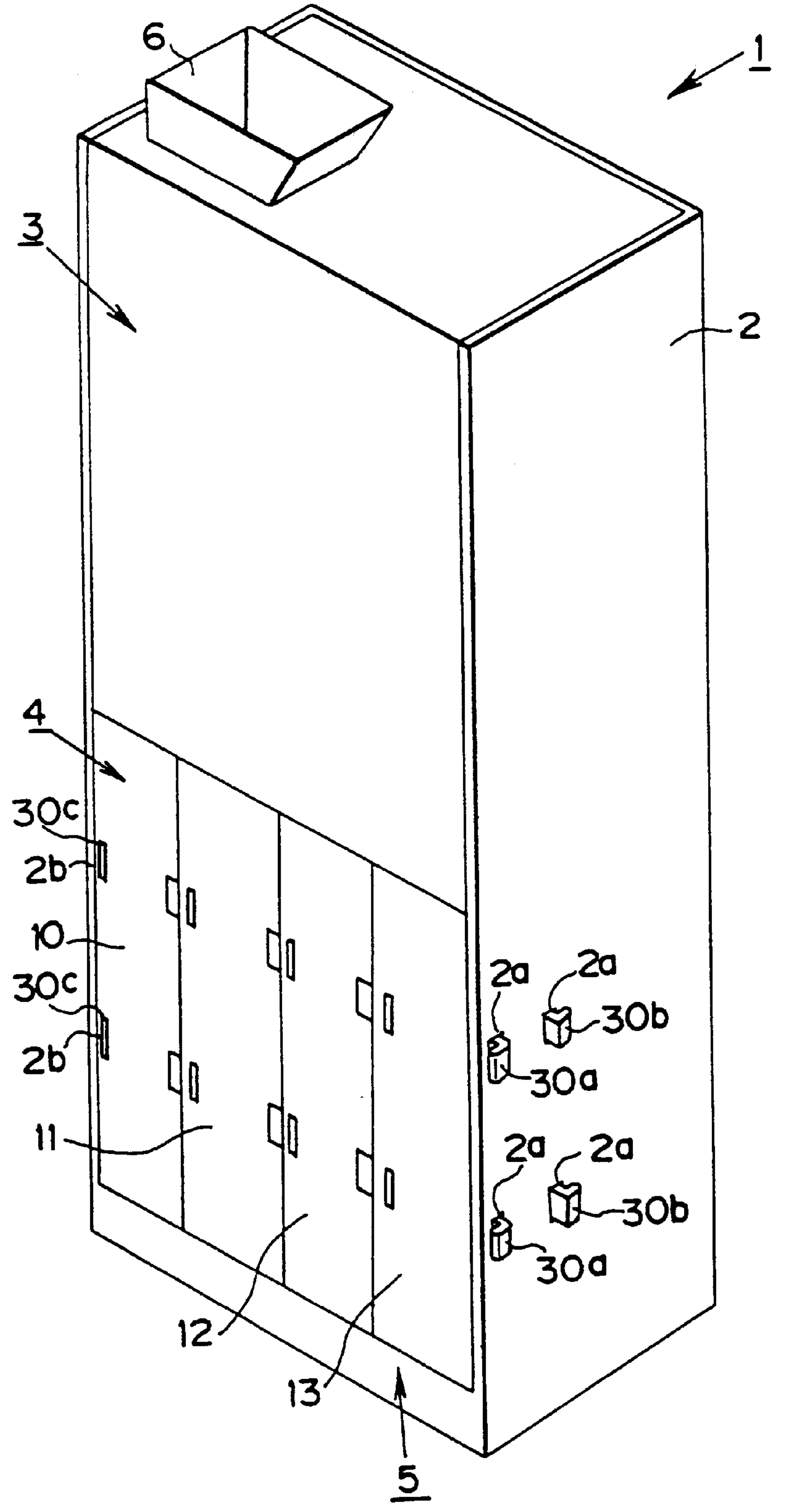
FIG. 1 is a schematic perspective view depicting a coin processing device of the first embodiment in accordance with the first aspect of the present invention.

FIG. 1 is a schematic perspective view of a coin processing device of the first embodiment in accordance with the first aspect of the present invention.

Like the conventional coin processing device, the coin processing device 1 of the first embodiment comprises coin selecting means 3 which is detachably equipped in the upper part of a device main body 2, coin storage means 4 which is detachably attached in the lower part of the coin selecting means 3, and change payment means 5 which is equipped below the coin storage means 4 and on the bottom face of the device main body 2.

In the coin processing device 1, when a coin is entered into a coin entry port 6 of the coin selecting means 3, the coin selecting means 3 judges the genuineness of the coin, then a counterfeit coin is returned to a coin returning port, which is not illustrated in the accompanying drawings, by way of the coin selecting means 3. For a genuine coin, the denomination thereof is judged first, and then the genuine coin is stored in the coin storage means 4 separately for each denomination.

When denominations are specified according to the amount of change, coins for the change are returned to the coin returning port, not illustrated, from the coin storage means by way of the change payment means 5.

The coin storage means 4 comprises a plurality of coin tubes 10, 11, 12 and 13, which are separately formed and have respective internal diameters according to the external diameters of the coins to be used, and these coin tubes 10, 11, 12 and 13 are arranged next to each other.

Figure 2:
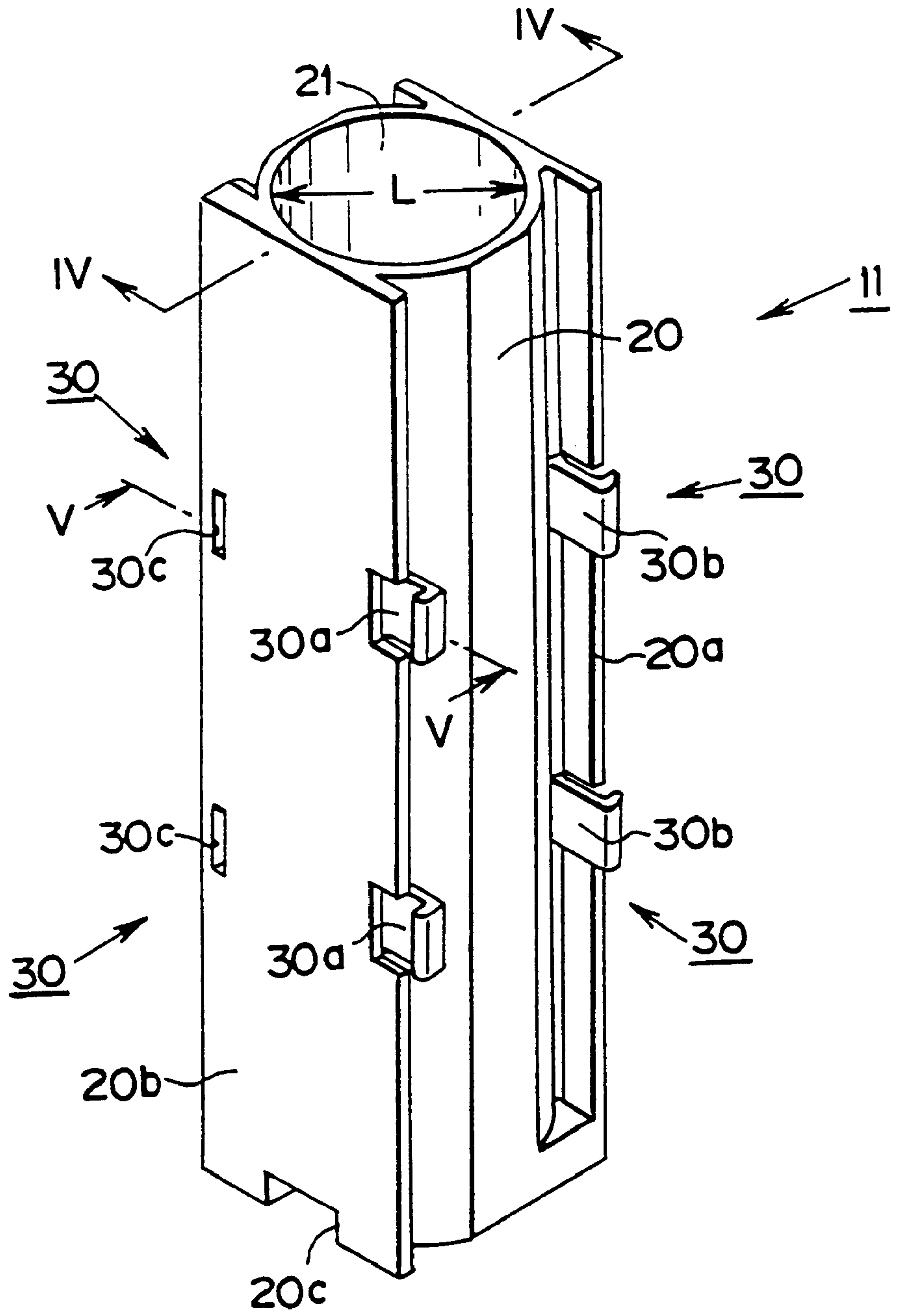
FIG. 2 is a schematic perspective view of a coin tube single unit.

Referring to FIG. 2, out of the plurality of coin tubes 10, 11, 12 and 13, the coin tube 11, for example, comprises a tubular body 20 having an internal diameter L which is approximately the same size as the external diameter of a coin to be stored, and linking means 30 which is formed on both sides of the tubular body 20.

The tubular body 20 has a coin storing hole 21 at the center where coins are loaded in a horizontal position, and a front face 20*a* and a rear face 20*b* are formed in rectangular shapes so as to constitute the external walls of the coin storage means 4.

The linking means 30 for linking adjacent coin tubes is integrated with the rectangular shaped front face 20*a* and rear face 20*b* respectively.

The linking means 30 comprises a pair of engagement latches 30*a* and 30*b* located at the right side of the coin tube 11 and are engaged with the adjacent coin tube 12, and a pair of engagement holes 30*c* and 30*d* located at the left side of the coin tube 11, with which engagement latches 30*a* and 30*b* of the adjacent coin tube 10 engage (FIG. 5), where the pair of engagement latches 30*a* and 30*b* and the pair of engagement holes 30*c* and 30*d* face each other, and are vertically equipped at two locations respectively along the tubular body with a specified space therebetween.

Figure 5:
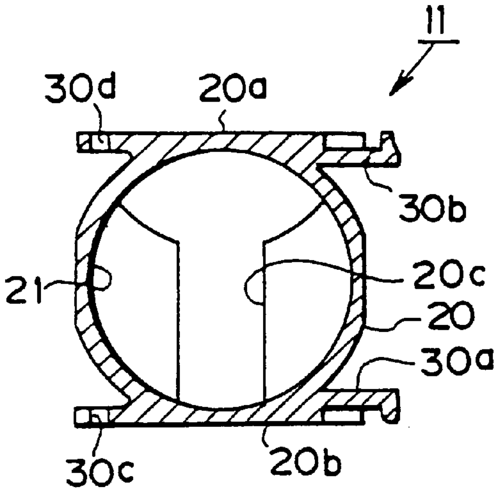
FIG. 5 is a sectional view taken along the line V—V of FIG. 2.
Figure 6:
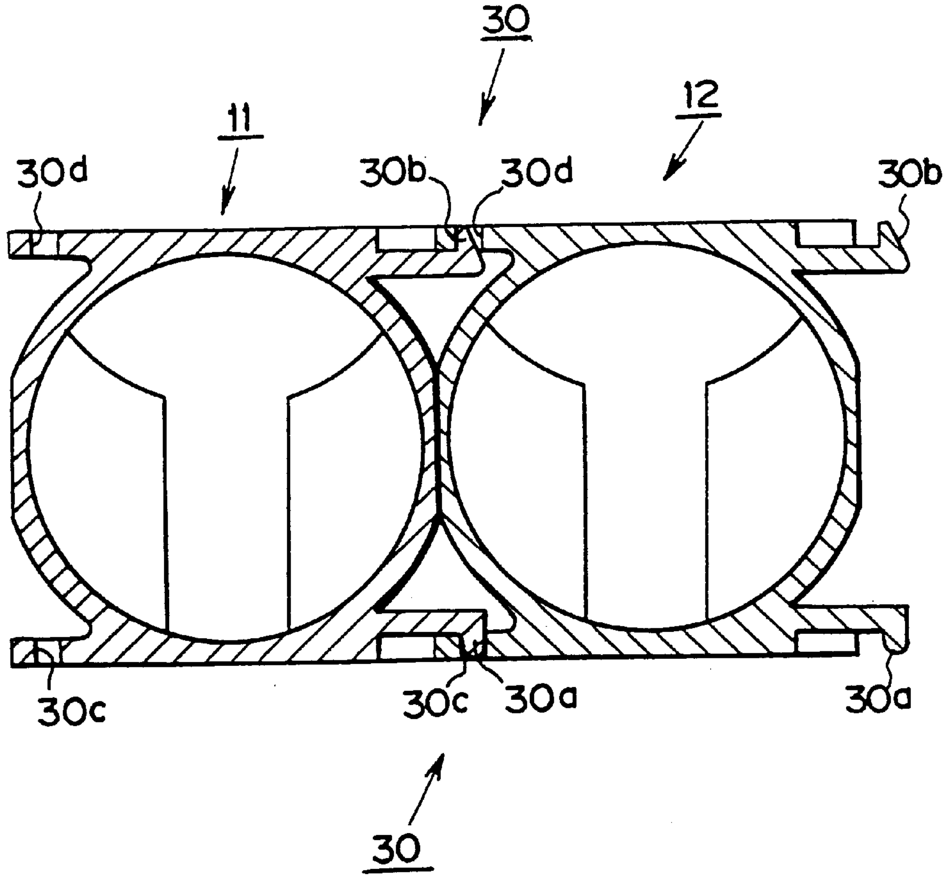
FIG. 6 is a schematic sectional view depicting two coin tube single units which are linked by linking means.

The pairs of engagement holes 30*c* and 30*d* (FIG. 5) have a rectangular cross section, and in the pairs of engagement latches 30*a* and 30*b*, the tip of both latches is bent about 90 degrees to the outside, and the tip of one engagement latch 30*b* has a taper-shaped cross section, and the tip of the other engagement latch 30*a* has an arc-shaped cross section as are best shown in FIG. 6.

Figure 3:
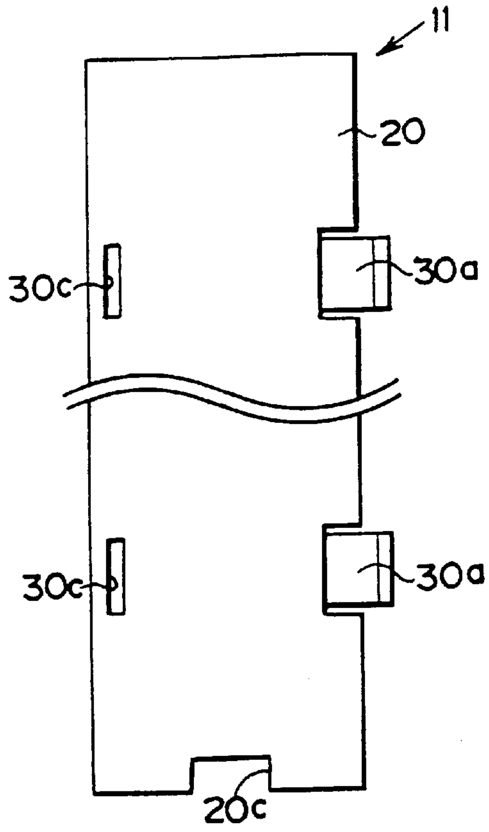
FIG. 3 is a rear view of the coin tube single unit of FIG. 2.
Figure 4:
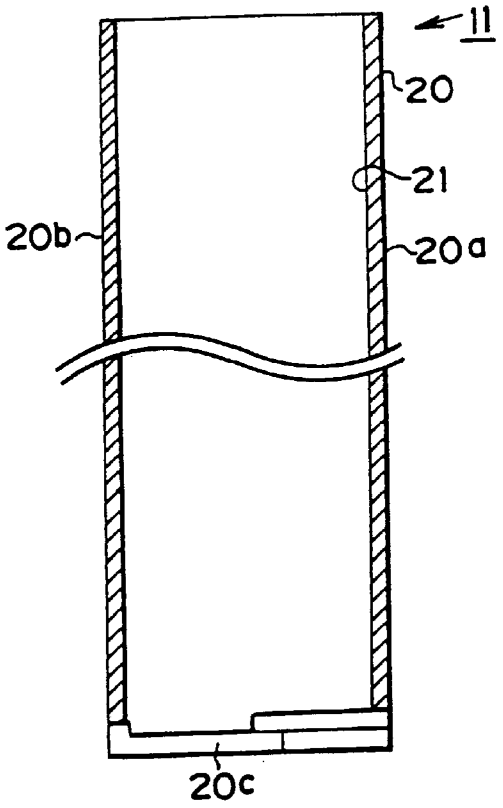
FIG. 4 is a sectional view taken along the line IV—IV of FIG. 2.

FIG. 3 is a rear view of the coin tube in FIG. 2, and FIG. 4 is a IV—IV sectional view of FIG. 2. As FIG. 4 shows, a slit 20*c* is formed at the bottom face of the tubular body 20 so as to insert thereinto a pay out slide, which is not illustrated, of the change payment means.

Other coin tubes 10, 12 and 13 in FIG. 1 have a respective internal diameter L which is approximately the same size as the respective external diameter of the coins which each tube stores. The distance between the front face and rear face of each coin tube 10, 11, 12 and 13 is approximately the same.

In order to link each of these coin tubes 10, 11, 12 and 13, in the case of coin tubes 11 and 12 for example, the pairs of engagement latches 30*a* and 30*b* of the coin tube 11 are engaged with the pairs of engagement holes 30*c* and 30*d* of the coin tube 12. Thus, these tubes are firmly linked by the linking means 30.

To engage the pairs of engagement latches 30*a* and 30*b* of the coin tube 11 with the pairs of engagement holes 30*c* and 30*d* of the coin tube 12, the engagement latch 30*a*, whose tip has an arc-shaped cross section, of the coin tube 11, is engaged with the engagement hole 30*c* of the coin tube 12 first, and then the engagement latch 30*b*, whose tip has a taper-shaped cross section, of the coin tube 11, is engaged with the engagement hole 30*d* of the coin tube 12. In this manner, each coin tube 10, 11, 12 and 13 is smoothly linked together.

Since the distance between the front face and the rear face is set to approximately the same for each coin tube 10, 11, 12 and 13, the external walls of the coin storage means 4 becomes planes when the coin tubes 10, 11, 12 and 13 are linked together by the linking means 30.

To release linkage among each coin tube 10, 11, 12 and 13, each engagement latch 30*a* and 30*b* of each coin tube 10, 11, 12 and 13 are bent using a jig, such as a screw driver, so as to release engagement between each engagement hole 30*c* and 30*d* and each engagement latch 30*a* and 30*b*.

Figure 7:
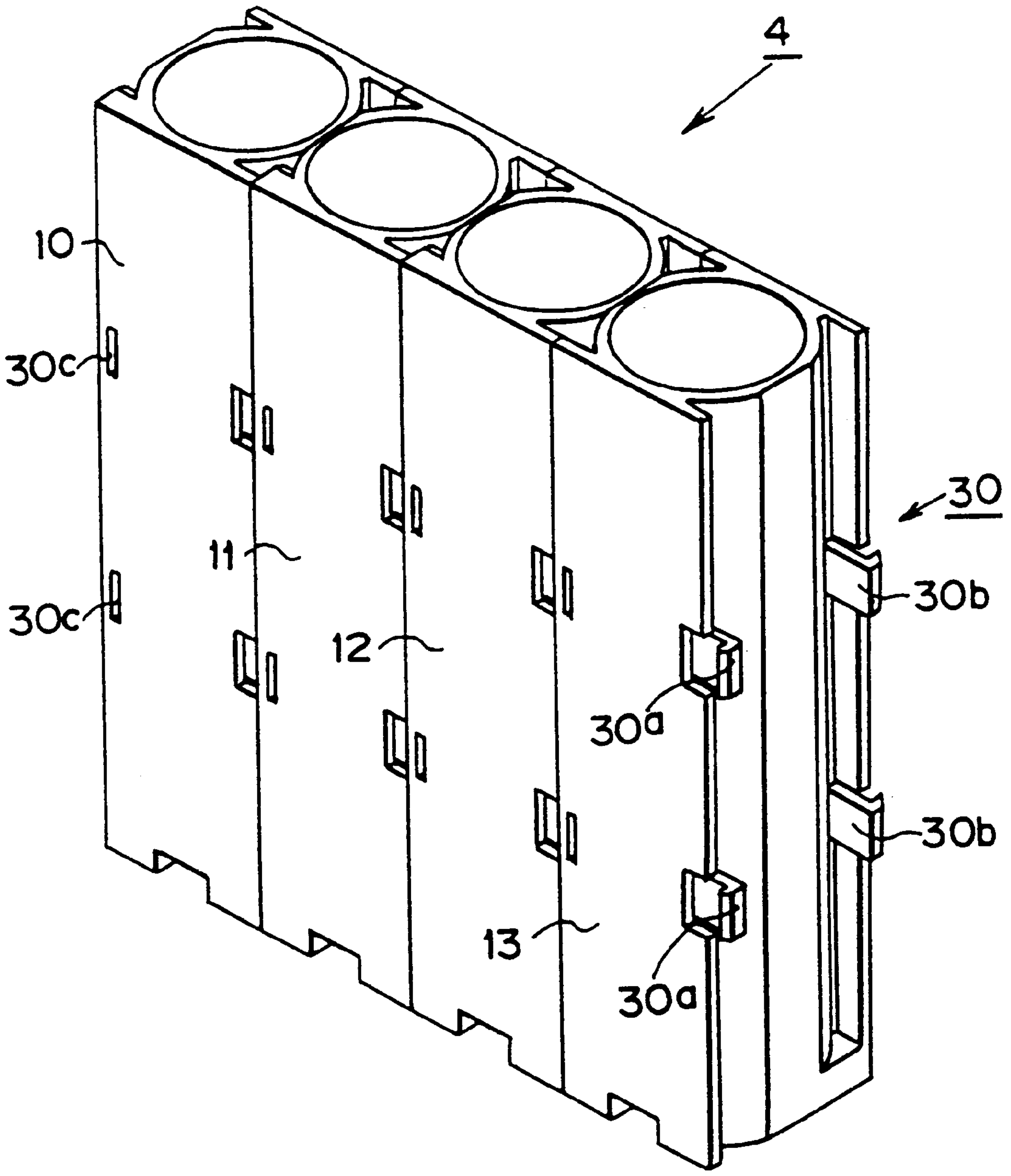
FIG. 7 is a schematic perspective view depicting the coin storage means where four coin tube single units are linked.

FIG. 7 is a perspective view depicting a status when each coin tube 10, 11, 12 and 13 are linked into one unit of the coin storage means 4 by way of the linking means 30.

To mount the coin storage means 4 in the device main body 2 shown in FIG. 1, the pairs of engagement latches 30*a* and 30*b* which protrude from the right of the coin tube 13 located at the right end of the coin storage means 4, are engaged with the engagement hole 2*a* which has a rectangular cross section and is located at four locations at the right of the device main body 2 corresponding to the location of the pairs of engagement latches 30*a* and 30*b*, and each engagement hole 30*c* and 30*d* at the left of the coin tube 10 located at the left end of the coin storage means 4 are engaged with the engagement latch 2*b* (the engagement latch 2*b* has the same shape as the pairs of engagement latches 30*a* and 30*b*) located at four locations at the left of the device main body 2 corresponding to the locations of the pairs of engagement holes 30*c* and 30*d* located at the left of the coin tube 10. In this manner, the coin storage means 4 can be mounted in the device main body 2.

The engagement holes 2*a* at the right side of the device main body 2 that engage with the pairs of engagement latches 30*a* and 30*b* of the coin tube 13, and the engagement latches 2*b* at the left side of the device main body 2 that engage with the pairs of engagement holes 30*c* and 30*d* of the coin tube 10 constitute the engagement means for detachably attaching the coin storage means 4 to the device main body 2.

In the coin storage means 4 according to this embodiment, a plurality of the coin tubes 10, 11, 12 and 13 which are independent and have different diameters, are linked and integrated into one unit, and the integrated type coin tubes 10, 11, 12 and 13 are detachably attached to the device main body 2. Therefore, if a plurality of the coin tubes 10, 11, 12, 13 . . . are prepared as options to be used for the coin storage means, the coin storage means 4 corresponding to the various coins with different diameters can easily be provided by selecting the coin tubes corresponding to the diameters of the coins to be used and by inter-linking the tubes. As a result, unlike the conventional integrated type coin tubes, manufacturing a new unit corresponding to the new coins to be used is unnecessary.

In the coin processing device 1 of the first embodiment, the linking means 30 comprises pairs of engagement latches at the right of the coin tube for engaging with the engagement holes of the adjacent coin tube, and pairs of engagement holes at the left of the coin tube for engaging with the engagement latches of the adjacent coin tube, as shown in FIG. 7. However, the present invention is not restrictive to this embodiment. The engagement latches and the engagement holes of the linking means are not necessarily provided as pairs, but may be provided in other manners as long as they are formed on the sides of the coin tube.

Referring back to FIG. 1, the engaging means for detachably attaching the coin storage means 4 to the device main body 2 comprises the engagement hole 2*a* at the right of the device main body 2 for engaging pairs of engagement latches 30*a* and 30*b* of the coin tube 13, and the engagement latches 2*b* at the left of the device main body 2 for engaging pairs of engagement holes 30*c* and 30*d* of the coin tube 10, but this is not restrictive, and the engaging means may be configured, for example, with guide grooves that guide and engage pairs of cylindrical protrusions formed at the top and bottom part of one side of the coin storage means.

Figure 8:
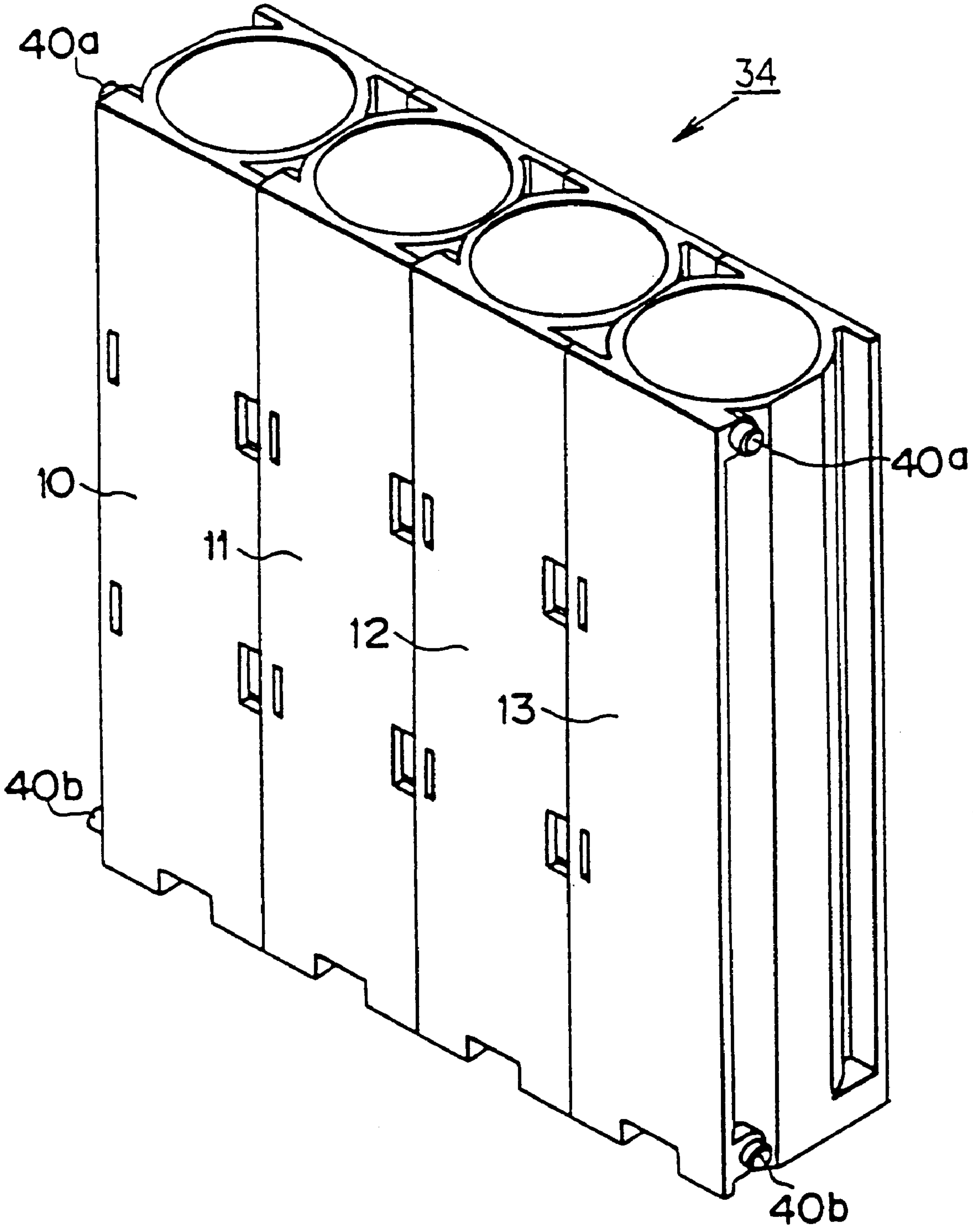
FIG. 8 is a schematic perspective view depicting coin storage means of a coin processing device of the second embodiment in accordance with the first aspect of the present invention.

FIG. 8 is a schematic perspective view of the coin storage means of the coin processing device of the second embodiment in accordance with the first aspect of the present invention, where the same symbols as in FIG. 7 are used if the same sections are indicated.

In the coin storage means 34 of the coin processing device 35 according to the second embodiment of the first aspect of the present invention, there is a pair of cylindrical protrusions 40*a* and 40*b* at the top and bottom respectively of one side of the coin tube 10 and 13 (left side of coin tube 10 and right side of coin tube 13) which are located on both sides of the coin storage means 26, in place of the pair of engagement latches 30*a* and 30*b* and the pair of engagement holes 30*c* and 30*d* of the coin storage means 4 of the first embodiment in FIG. 7.

Figure 9:
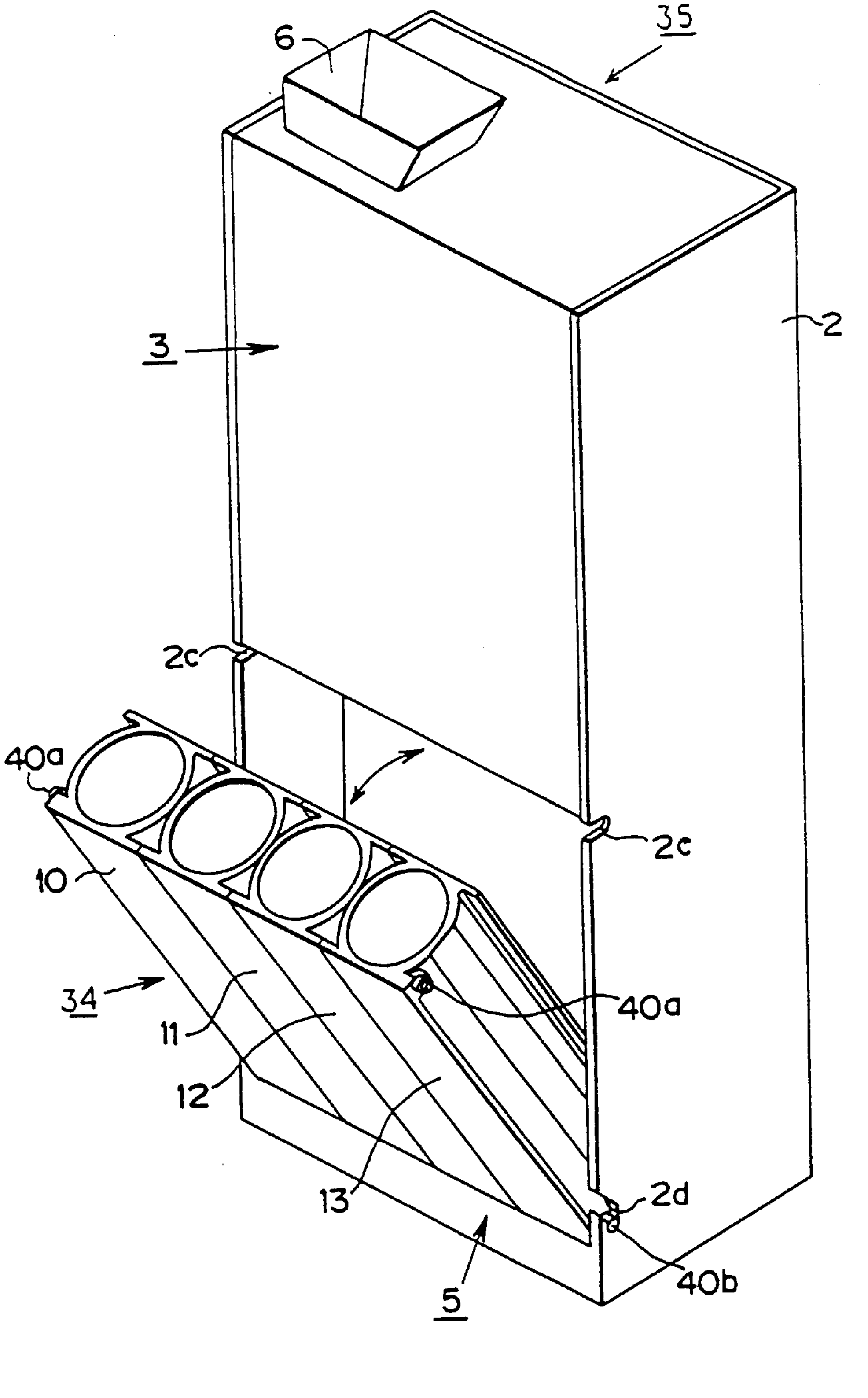
FIG. 9 is a schematic perspective view depicting a status before the coin storage means in FIG. 8 is attached to the device main body.

The engaging means for detachably attaching the coin storage means 34 to the device main body 2 is provided in the device main body 2, and comprises the guide grooves 2*c* and 2*d* at locations corresponding to each protrusion 40*a* and 40*b*, as shown in FIG. 9.

Figure 10:
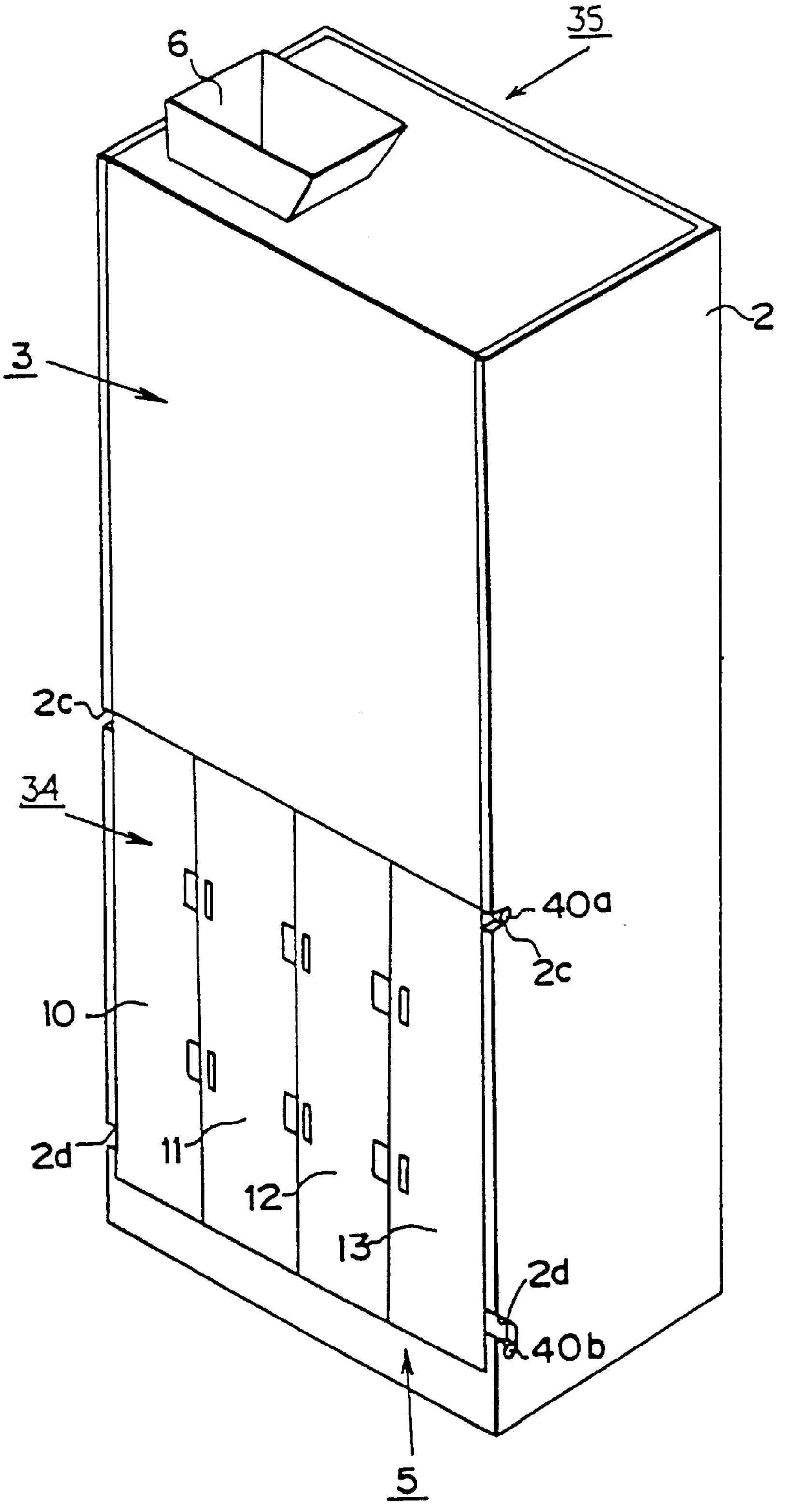
FIG. 10 is a schematic perspective view depicting a status after the coin storage means in FIG. 8 is attached to the device main body.

In the coin processing device 35 according to the second embodiment of the first aspect of the present invention, each of these protrusions 40*a* and 40*b* are engaged with the guide grooves 2*c* and 2*d* formed at the corresponding locations of the device main body 2, and the coin storage means 34 is turned in the direction indicated by arrow marks as shown in FIG. 9, so as to detachably attach each coin tube 10, 11, 12 and 13 of the coin storage means 34 to the device main body as shown in FIG. 10.

In the coin processing device 1 and 35 of the first and second embodiment, the linking means 30 comprises the engagement holes 30*c* and 30*d*, and the engagement latches 30*a* and 30*b* that engage with the engagement holes, which are formed for each coin tube 10, 11, 12 and 13, but the present invention is not restricted to these embodiments, and the linking means may comprise a pair of cylindrical shaped inter-fitting holes and a pair of cylindrical shaped inter-fitting protrusions which inter-fit inside the pair of inter-fitting holes, formed for each coin tube.

Figure 11:
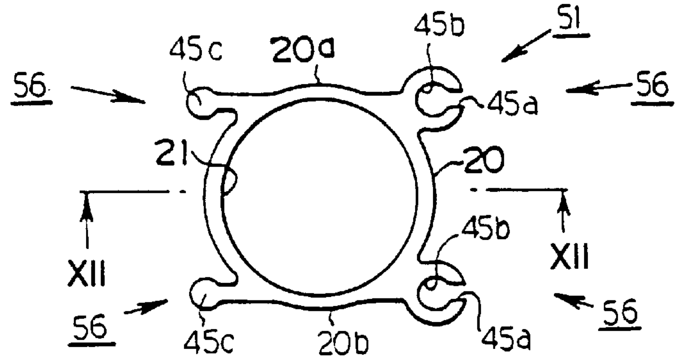
FIG. 11 is a top view of a coin tube of a coin processing device of the third embodiment in accordance with the first aspect of the present invention.
Figure 12:
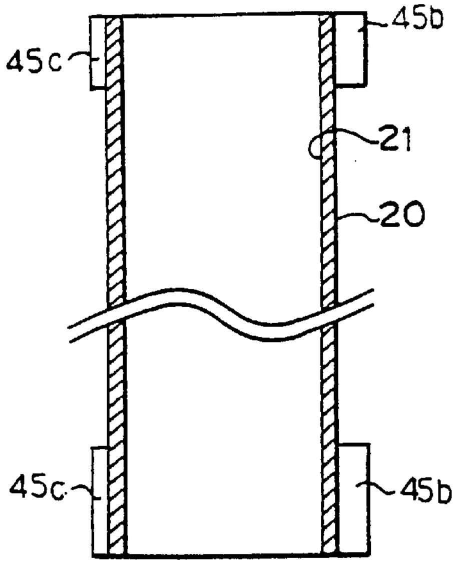
FIG. 12 is a sectional view taken along the line XII—XII of FIG. 11.

FIG. 11 is a top view of the coin tube of the coin processing device according to the third embodiment of the first aspect of the present invention, and FIG. 12 is a sectional view taken along the line XII—XII of FIG. 11, where the same sections as in FIG. 5 are indicated with the same symbols as in FIG. 5.

The coin tube 51 of the coin processing device according to the third embodiment of the first aspect of the present invention has linking means 56 which comprises a pair of cylindrical shaped inter-fitting holes 45*b* which have a slit 45*a* in the vertical direction, and a pair of cylindrical shaped inter-fitting protrusions 45*c* which inter-fit inside the pair of inter-fitting holes 45*b*.

The pair of inter-fitting holes 45*b* and the pair of inter-fitting protrusions 45*c* are located so as to face each other, and are provided at two locations along the vertical direction of the tubular body 20 with a specified space therebetween.

To link each coin tube 50, 51, 52 and 53 that has the abovementioned linking means 56, each inter-fitting protrusion 45*c* of each coin tube 51, 52 and 53 inter-fits into each inter-fitting hole 45*b* of coin tube 50, 51, 52 and 53, then each coin tube 50, 51, 52 and 53 is firmly linked by way of the linking means 56 so that the coin storage means 54 is configured.

Figure 13:
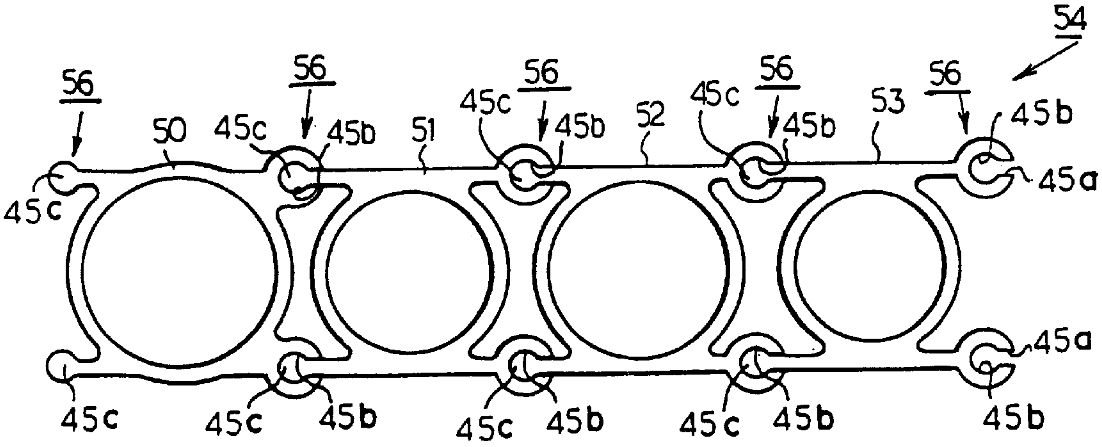
FIG. 13 is a top view depicting a status when each one of the coin tubes is linked.

To attach the coin storage means 54 which has the linking means consisting of the pairs of inter-fitting holes 45*b* and the pairs of inter-fitting protrusions 45*c* to the device main body 2 shown in FIG. 1, inter-fitting holes that have the same structure as the pairs of inter-fitting holes 45*b* are formed in the device main body 2 at the locations corresponding to the inter-fitting protrusions 45*c* formed at the left of the coin tube 50 shown in FIG. 13, inter-fitting protrusions that have the same structure as the pairs of inter-fitting protrusions 45*c* are formed in the device main body 2 at the locations corresponding to the pairs of inter-fitting holes 45*b* formed at the right of the coin tube 53 shown in FIG. 13, and the pairs of inter-fitting holes 45*b* formed at the right of the coin tube 53 are inter-fitted with the inter-fitting protrusions, while the inter-fitting protrusions 45*c* formed at the left of the coin tube 50 are inter-fitted into the inter-fitting holes in the device main body 2.

As described above, in the coin processing device of the first aspect of the present invention, the coin storage means for storing genuine coins for each denomination comprises the plurality of coin tubes each of which are formed separately, and the linking means which is formed separately for each coin tube, therefore coin storage means corresponding to various coins to be used can be provided by selecting coin tubes corresponding to the coins that have different diameters and linking the coin tubes. As a result, a coin processing device that can store various coins can be easily provided, and a coin processing device corresponding to the currency of each country can be provided at a low price without manufacturing integrated type coin tubes for the various coins.

An embodiment of the coin processing device in accordance with the second aspect of the present invention is described next.

Figure 14:
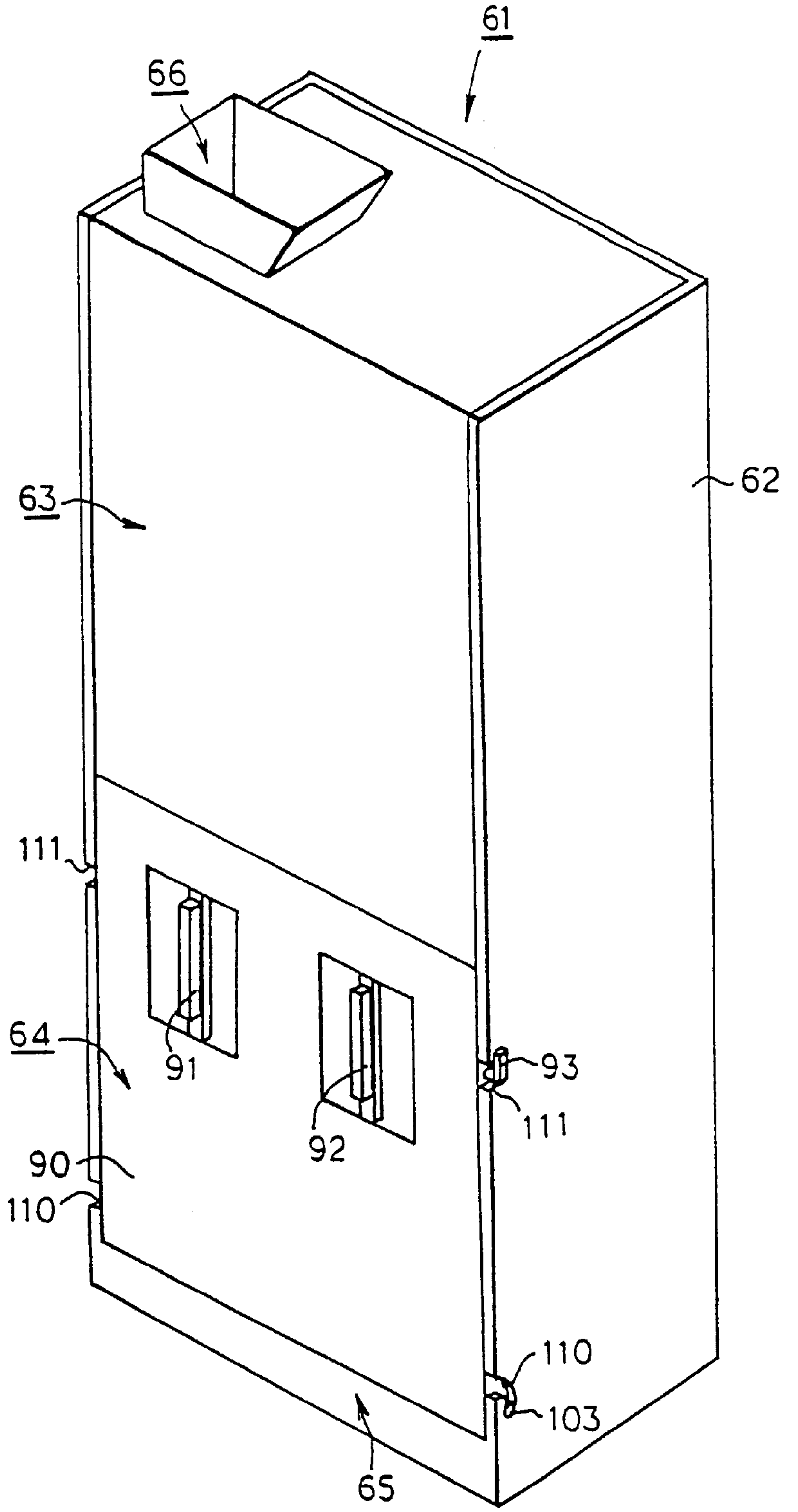
FIG. 14 is a schematic perspective view of a coin processing device of the second aspect of the present invention.

FIG. 14 is a schematic perspective view of the coin processing device in accordance with the second aspect of the present invention.

Like the conventional coin processing device, a coin processing device 61 in accordance with the second aspect of the present invention comprises coin selecting means 63 which is detachably attached in the upper area of a device main body 62, coin storage means 64 which is detachably supported below the coin selecting means 63, and change payment means 65 which is equipped below the coin storage means 64 and at the very bottom of the device main body 62.

In this coin processing device 61, when a coin is entered into a coin entry port 66 of the coin selecting means 63, the genuineness of the coin is judged by the coin selecting means 63, a counterfeit coin is returned to a coin returning port, which is not illustrated in the accompanying drawings, by way of the coin selecting means 63, and for a genuine coin, the denomination is judged and then the coin is stored in the coin storage means 64 separately for each denomination.

When the denominations of coins for the amount of change is specified, coins for the change are returned to the coin returning port, which is not illustrated in the drawings, from the coin storage means 64 by way of the change payment means 65.

Figure 15:
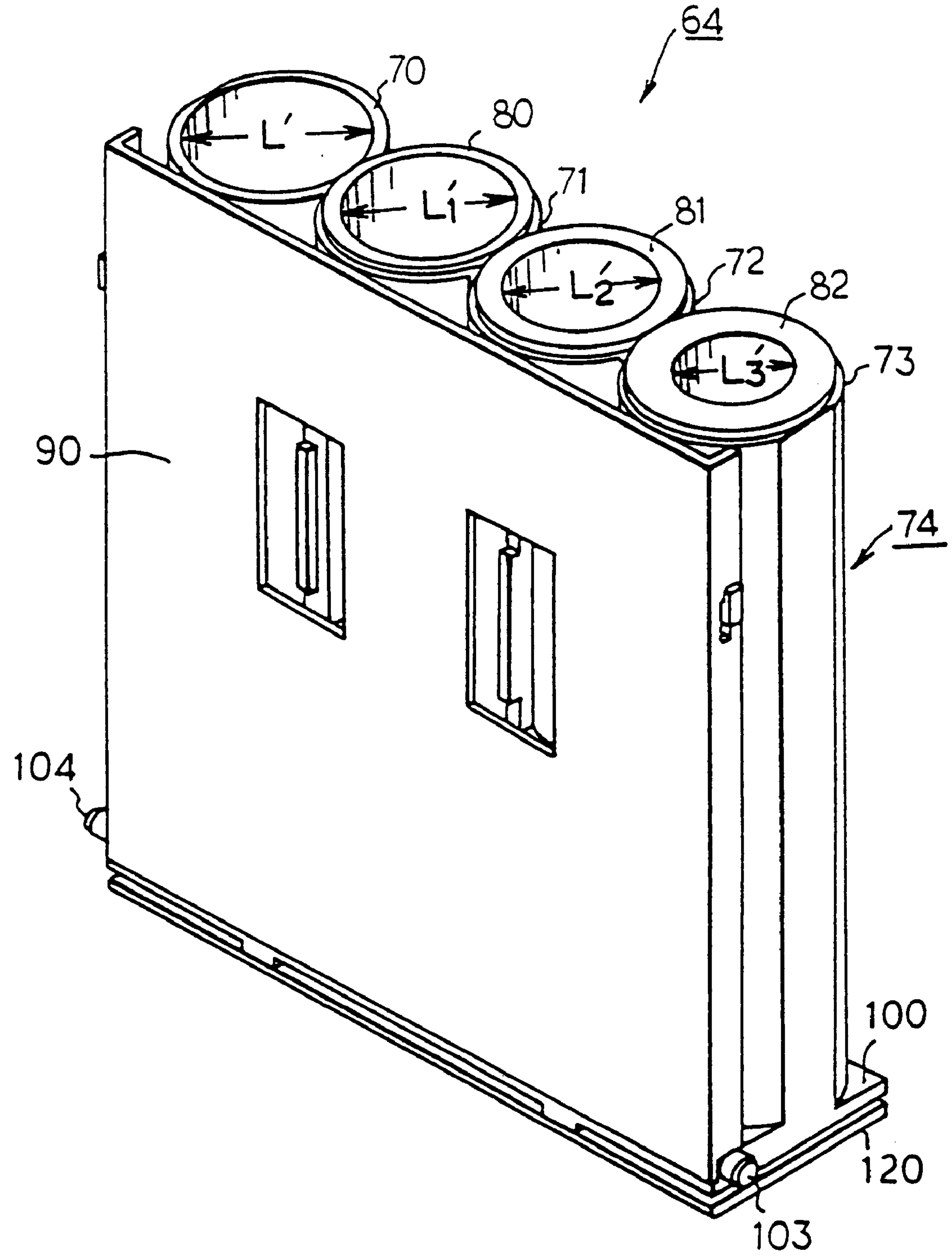
FIG. 15 is a schematic perspective view of the coin storage means.

The coin storage means 64 comprises, as shown in the schematic perspective view in FIG. 15, integrated type coin tubes 74 where a plurality of coin tubes 70, 71, 72 and 73 are integrated, adapter tubes 80, 81 and 82 which are inserted in the coin tubes 71, 72 and 73 for changing the internal diameter, and a front cover 90 which covers the front face of the integrated type coin tubes 74.

Figure 16:
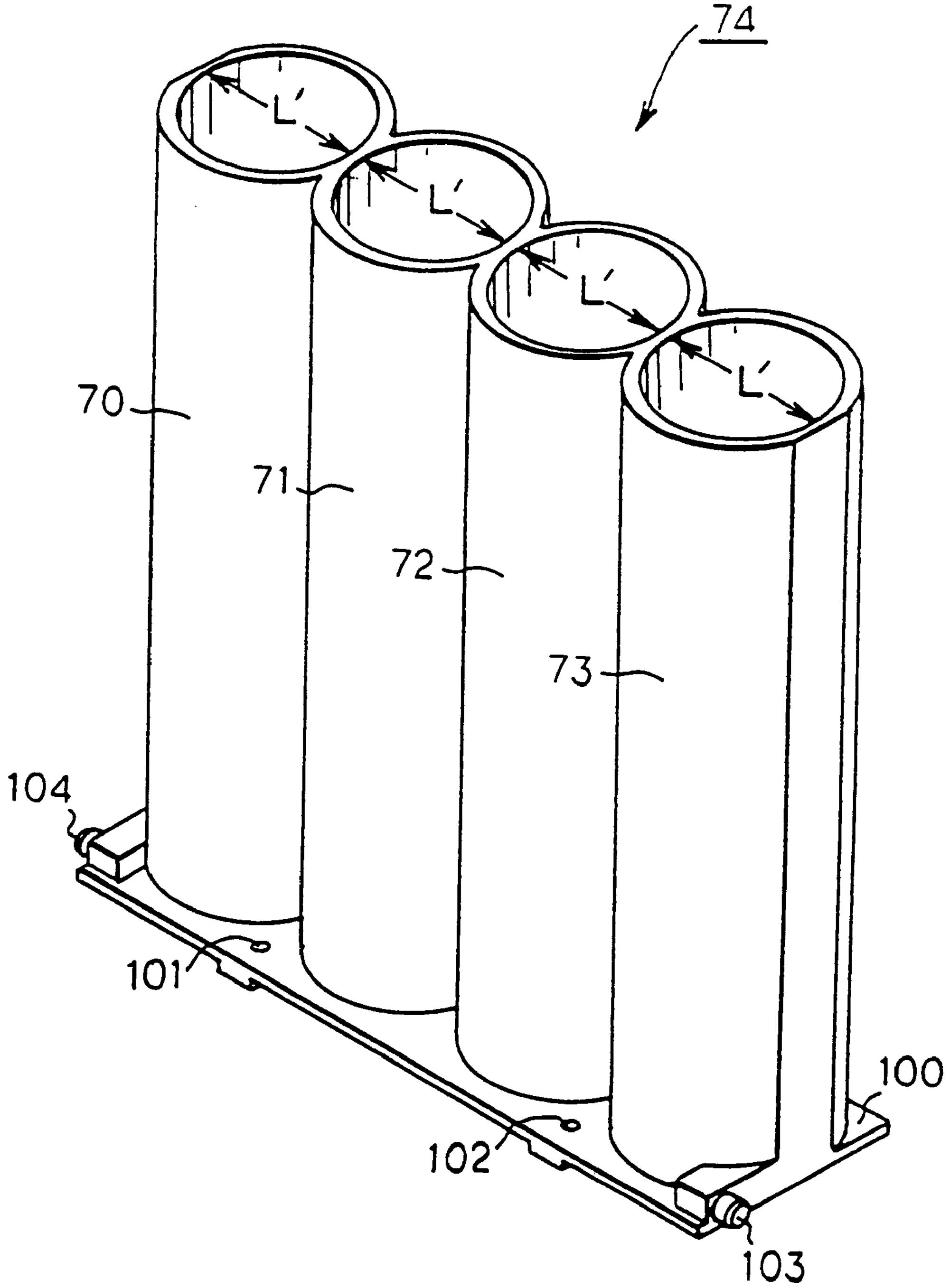
FIG. 16 is a schematic perspective view of the integrated type coin tubes that have the same diameter.

Referring to FIG. 16, the integrated type coin tubes 74 comprise four coin tubes 70, 71, 72 and 73 whose internal diameter L' is the same. On top of the bottom face 100 of the integrated type coin tubes 74, a pair of holes 101 and 102 are opened for attaching the front cover 90 (FIG. 15), and there are protrusions 103 and 104 on both sides of the bottom face, for attaching the integrated type coin tubes 74 to the device main body 62 (FIG. 14).

The reference number 120 in FIG. 15 indicates a base where a pay out slide, which is not illustrated here, of the change payment means 65 (FIG. 14) is inserted.

Now, adapter tubes 80, 81 and 82 which are inserted in each coin tube 71, 72 and 73 for changing the internal diameter of each coin tube is described using the adapter tube 81 as an example.

Figure 17:
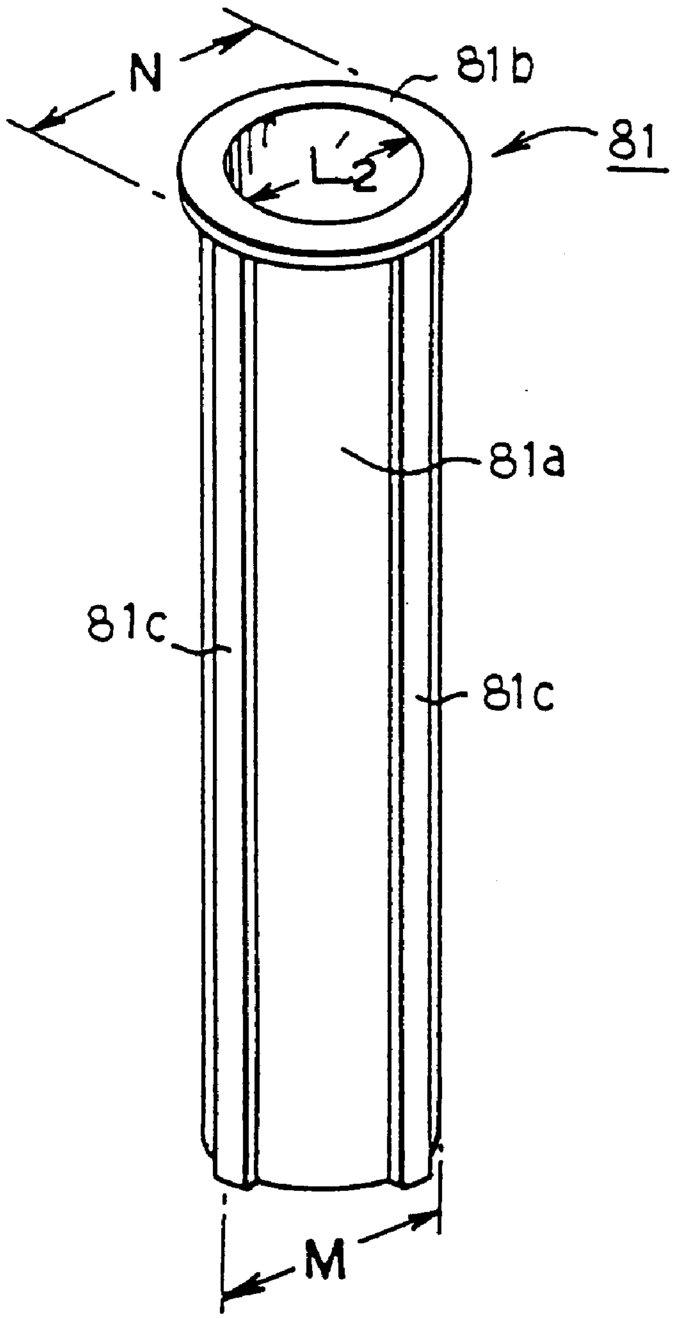
FIG. 17 is a schematic perspective view of an adapter tube.

FIG. 17 is a schematic perspective view of the adapter tube 81, where the adapter tube 81 comprises a cylindrical tubular body 81*a*, a flange section 81*b* which is integrated at the top of the tubular body 81*a*, and a plurality of ribs 81*c* which protrude from the external surface of the tubular body 81*a* along the longitudinal direction of the tubular body 81*a*.

The external diameter M of the tubular body 81*a* including the plurality of ribs 81*c* has been set to approximately the same size as each internal diameter L' of four coin tubes 70, 71, 72 and 73 shown in FIG. 16. The internal diameter L2' of the tubular body 81*a* which is supported inside the coin tube 71*a* by the plurality of ribs 81*c* has been set to a diameter corresponding to the specific coin to be stored by adjusting the thickness of the plurality of ribs 81*c* protruding from the tube 81*a*.

The external diameter N of the flange section 81*b* which is integrated at the top of the tubular body 81*a* has been set to a size slightly larger than the internal diameter L' of each one of the four coin tubes 70, 71, 72 and 73, shown in FIG. 16.

The sizes of other adapter tubes 80 and 82 shown in FIG. 15 have been set to the sizes so that the internal diameters L1' and L3' thereof correspond to the external diameters of specific coins which are to be stored, respectively. The elements of the adapter tubes have been set to the same size as those of the adapter tube 81, excluding internal diameters L1' and L3' and the thickness of the ribs. For the adapter tubes 80 and 82, too, the thickness of the plurality of ribs of each tubular body is adjusted so as to set the internal diameter L1' and L3' to the sizes corresponding to the external diameter of the specific coins to be stored respectively. The thickness of the ribs of the adapter tube 80 is "0", corresponding to the external diameter of the specific coins to be stored, as shown in FIG. 19.

Figure 18:
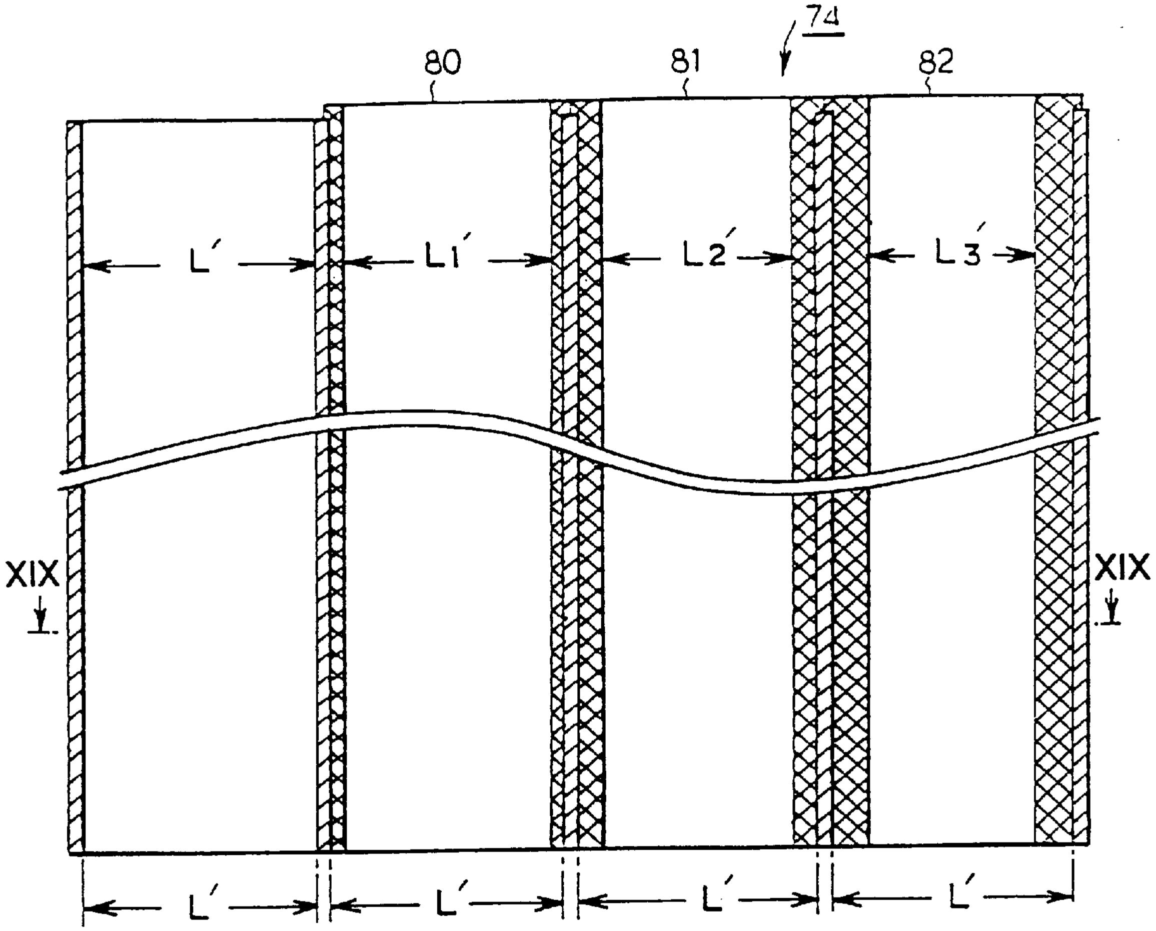
FIG. 18 is a schematic sectional view of key areas in the status where the adapter tubes are inserted in the integrated type coin tubes.
Figure 19:
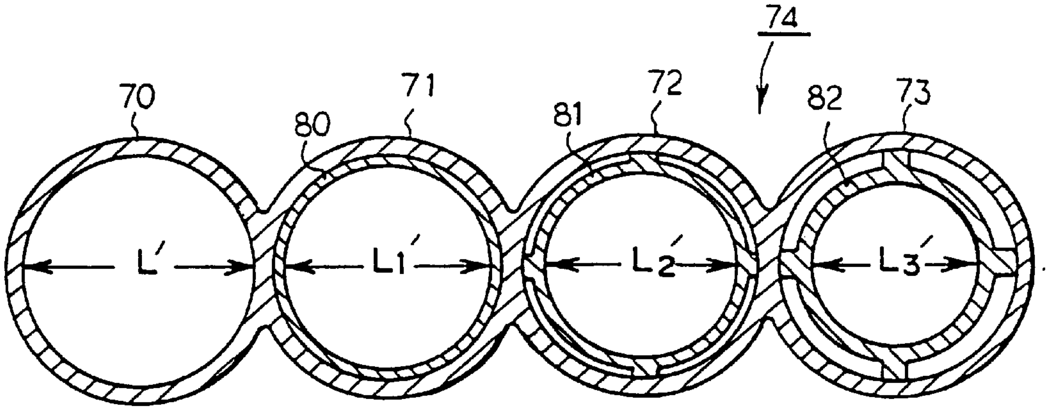
FIG. 19 is a sectional view taken along the line XIX—XIX of FIG. 18.

If each one of these adapter tubes 80, 81 and 82 is inserted to each coin tube 71, 72 and 73 of the integrated type coin tubes 74, as shown in FIG. 15, then the internal diameter L' of each coin tube 70, 71, 72 and 73 is changed by the internal diameter L1' , L2' and L3' of each adapter tube 70, 71 and 72, so that the four types of coins which external diameters are L', L1' L2' and L3' can be stored inside, as shown in FIG. 18, which is a sectional view of the main part of the coin tubes and in FIG. 19, which is a sectional view taken along the line XIX—XIX of FIG. 18.

Therefore, if the internal diameter L' of the integrated type coin tubes 74 is set to the maximum diameter of the coins to be used in advance, a plurality of adapter tubes 80, 81, 82 . . . which have different internal diameters are prepared as an option, and each adapter tube whose internal diameter matches the external diameter of a coin to be used is selected and is inserted in each coin tube 70, 71, 72 and 73 of the integrated type coin tubes 74, then the coin storage means 64 for various coins to be used which have different diameters can easily be provided, and it is unnecessary to manufacture a new integrated type coin tubes matching the coins to be used, unlike a conventional integrated type coin tubes which internal diameters are all different.

In these adapter tubes 80, 81 and 82, the external diameter M of each tubular body, including the plurality of ribs, has been set to approximately the same size as each internal diameter L' of the four coin tubes 70, 71, 72 and 73 shown in FIG. 16, therefore each adapter tube 80, 81 and 82 is stably supported by the plurality of the ribs on each adapter tube 80, 81 and 82 or by the tubular body. As a result, a coin transferred from the coin selecting means 63 is stored in one of the coin tube 70, 71 and 72 without fail.

Also, in these adapter tubes 80, 81 and 82, the external diameter N of each flange section has been set to a size slightly larger than the internal diameter L' of the coin tubes 70, 71, 72 and 73. Therefore, if the adapter tubes 80, 81 and 82 are inserted in each coin tube 71, 72 and 73 of the integrated type coin tubes 74, then each flange section of the adapter tubes 80, 81 and 82 is hooked and positioned at the top of the coin tubes 71, 72 and 73. In other words, each flange section of the adapter tubes 80, 81 and 82 functions as hooking means for hooking and positioning each tubular body of the coin tubes 71, 72 and 73 in each coin tube 71, 72 and 73. To remove the adapter tubes 80, 81 and 82 from the coin tubes 71, 72 and 73 respectively, each flange section is simply picked up and moved up away from the coin tubes 71, 72 and 73.

When each tubular body of the adapter tubes 80, 81 and 82 is hooked and positioned in the coin tubes 71, 72 and 73 by each flange section, the gap between each external surface of the adapter tubes 80, 81 and 82, and each internal surface of the coin tubes 71, 72 and 73 is covered by each flange section, which prevents dust and coins from getting caught in this gap.

The adapter tubes 81 and 82 have a plurality of ribs protruding from the external surface of respective tubes along the longitudinal direction, therefore contact areas between the adapter tubes 81 and 82 and the coin tubes 72 and 73 are small, which decreases friction between the adapter tubes 81 and 82 and the coin tubes 72 and 73 when the adapter tubes 81 and 82 are removed from the coin tubes 72 and 73, making a removal operation easy.

Figure 20:
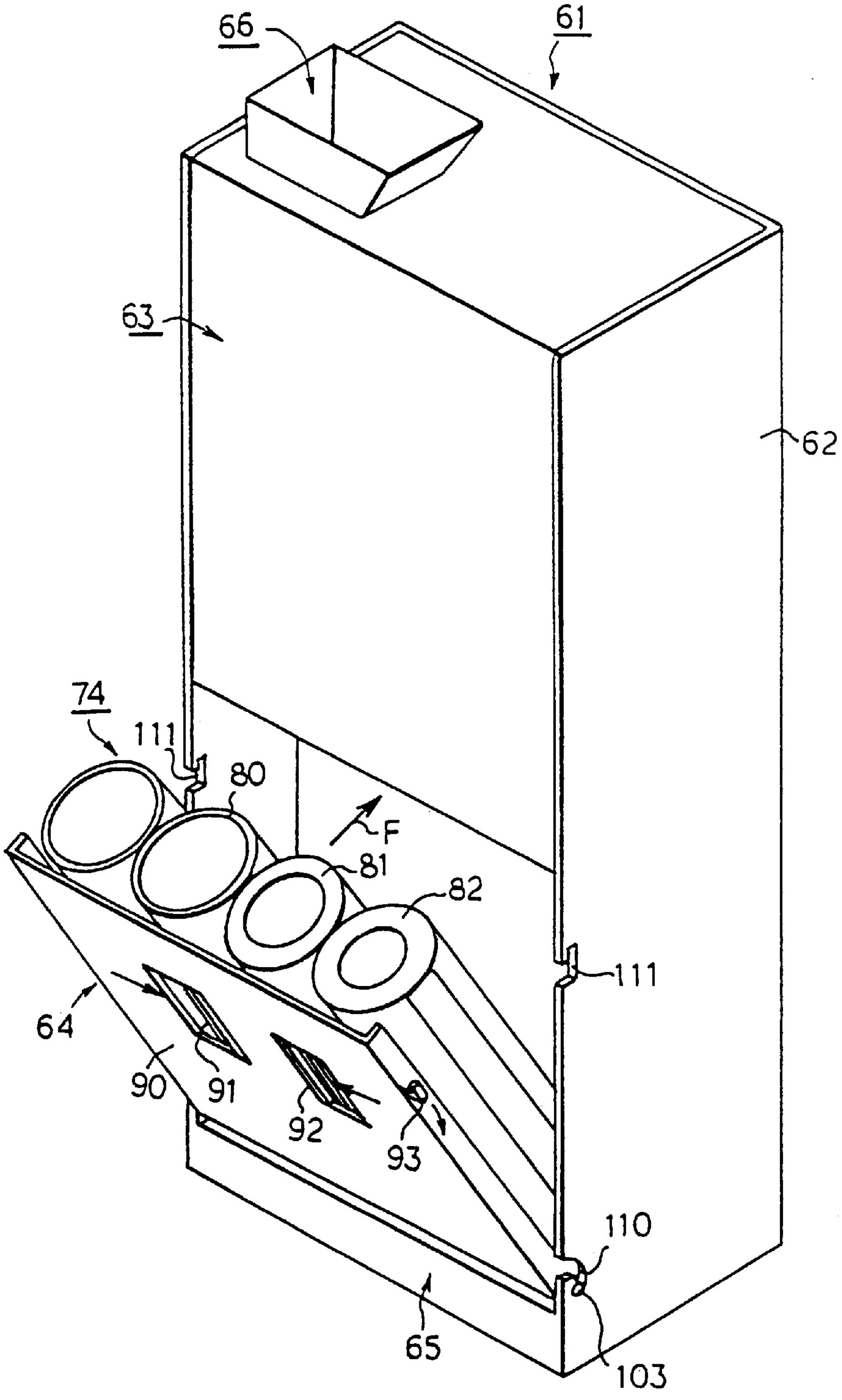
FIG. 20 is a schematic perspective view depicting a status before the coin storage means shown in FIG. 15 is attached to the device main body.

To mount the coin storage means 64 which comprises the integrated type coin tubes 74, where each adapter tube 80, 81 and 82 are attached, in the device main body 62, a pair of protrusions 103 and 104 protruding from both sides of the base 100 (FIG. 15) are inserted in the notched guide 110 formed on the device main body 62 at the corresponding position, then holding a pair of grips 91 and 92 on the front cover 90 in the arrow direction for tilting a pair of engagement latches 93 on both sides of the front cover 90, the front cover is rotated in the arrow mark F direction with the notched guide 110 as a center of rotation, so as to insert the pairs of engagement latches 93 to the notches 111 at the corresponding positions of the device main body 62, as shown in the perspective view of FIG. 20.

If the pair of grips 91 and 92 are then released, the pair of engagement latches 93 and the pair of the notches 111 are engaged and the coin storage means 64 is detachably attached to the device main body 62. The pair of engagement latches 93 and the pair of the notches 111 constitute the engaging means for detachably attaching the coin storage means 64 to the coin processing device main body 62.

In the above embodiment, each coin tube 70, 71, 72 and 73 of the integrated type coin tubes 74 has the same diameter, the internal diameters of the adapter tubes 80, 81 and 82 are approximately the same size as the external diameter of the coin to be stored, and the external diameters of the adapter tubes 80, 81 and 82 are approximately the same size as the internal diameter of each coin tube 70, 71 and 72, but this invention is not restricted to the above mentioned embodiment. Alternatively, it is also acceptable that the internal diameter of each coin tube of the integrated type coin tubes be different from each other, like the conventional integrated type coin tubes, the internal diameter of an adapter tube be formed to approximately the same size as the external diameter of a coin to be stored, and the external diameter of the adapter tube be formed to be approximately the same size as the internal diameter of each insertion target coin tube. In this case, the external diameter of each adapter tube is different from each other corresponding to the internal diameter of each insertion target coin tube, but even in this case, if a plurality of adapter tubes which have different diameters are prepared as options, adapter tubes having internal diameters corresponding to the external diameters of the coins to be used are selected, and these adapter tubes are inserted in each coin tube having a different internal diameter of the integrated type coin tubes, then the coin storage means 64 for the various coins with different external diameters to be used can be easily provided, and it is unnecessary to manufacture a new coin tube for coins to be used, unlike the conventional integrated type coin tubes.

Also, in the above embodiment, the coin storage means 64 is rotatably supported in the device main body 62 of the coin processing device 61, and is detachably attached to the device main body 62 by way of the engaging means, but this is not restrictive, and the coin storage means 64 may not be rotatably supported in the device main body 62. For example, the coin storage means 64 may be detachably attached to the device main body by screws.

Further, in this embodiment, the thickness of ribs on each tubular body of the adapter tubes 80, 81 and 82 is adjusted so that each internal diameter L1', L2' and L3' is set to the external diameter of each specific coin to be stored, but this is not restrictive, and each internal diameter L1', L2' and L3' of the adapter tubes 80, 81 and 82 may be adjusted by the thickness of each tubular body, or may be adjusted by the thickness of each tubular body and/or the thickness of the ribs. Further, the adapter tubes 80, 81 and 82 may not have ribs, such as the adapter tube 80 shown in FIG. 19, and each internal diameter L1', L2' and L3' of the adapter tubes 80, 81 and 82 may be adjusted by the thickness of each tubular body.

Also in this embodiment, the hooking means for hooking and positioning the adapter tube in the integrate type coin tube comprises the flange section which is integrated in the top of the tubular body of the adapter tube, but this is not restrictive, and the hooking means may be, for example, an inter-fitting component which is formed on the top of the tubular body of the adapter tube, such that the adapter tube is hooked and positioned in the integrated type coin tube. This hooking means may be equipped in the integrated type coin tube, or the hooking means may not be equipped at all.

As described above, in the coin processing device in accordance with the second aspect of the present invention, the coin storage means for storing genuine coins separately for each denomination, comprises the integrated type coin tubes where the plurality of coin tubes are integrated into one unit, and the adapter tubes which are inserted in each or some of the plurality of coin tubes for changing the internal diameter of the coin tubes. Therefore if a plurality of such adapter tubes are prepared as an option, adapter tubes corresponding to various coins with different diameters to be used are selected and are attached inside the integrated type coin tubes, then the coin storage means for various coins can be provided, and as a result, the coin processing device that can store various coins can be easily provided without manufacturing an integrated type coin tubes having different diameters separately for various coins, and the coin processing device corresponding to the currency of each country can be provided at low cost.

The first and second aspect of the present inventions may be embodied in still other ways without departing from the essential character thereof. The preferred embodiments described herein are therefore illustrative and not restrictive. The scope of the invention being indicated by the claims are not restricted by the description. The modification and changes that belong to the equivalent scope of the claims are all in the scope of the present invention.

What is claimed is:

1. A coin processing device comprising:

coin selecting means for judging genuineness of coins entered therein and sorting out the entered coins into genuine coins from counterfeit coins;

coin storage means for storing separately for each denomination the genuine coins selected by the coin selecting means; and change payment means for paying out coins according to the amount of change from the coin storage means, wherein the coin storage means comprises:

integrated type coin tubes in which a plurality of coin tubes are integrated into one unit; and adapter tubes each comprising a tube body which is inserted in the plurality of coin tubes, for changing internal diameters of the coin tubes.

2. The coin processing device according to claim 1, wherein the plurality of coin tubes of the integrated type coin tubes have the same internal diameter, and the internal diameters of the adapter tubes are approximately the same as the external diameters of coins to be stored, and the external diameters of the adapter tubes are approximately the same as the internal diameter of the coin tubes to which the adapter tubes are inserted.

3. The coin processing device according to claim 1, wherein the integrated type coin tubes where the plurality of coin tubes are integrated into one unit have different internal diameters, and the internal diameters of the adapter tubes are approximately the same as the external diameters of coins to be stored, and the external diameters of the adapter tubes are approximately the same as the internal diameters of corresponding one of the coin tubes to which the adapter tubes are inserted.

4. The coin processing device according to claim 1, wherein the coin storage means is rotatably supported in the coin processing device main body, and detachably attached to the coin processing device main body by way of engaging means.

5. The coin processing device according to claim 1, wherein the adapter tubes have hooking means for hooking and poistioning the adapter tubes inserted in the integrated type coin tubes.

6. The coin processing device according to claim 5, wherein the hooking means comprises a flange section integrated with the top of the tubular body of the adapter tubes.

7. The coin processing device according to claim 2, wherein the internal diameter of the plurality of coin tubes of the integrated type coin tubes is set to the maximum external diameters of the coins to be entered.

8. The coin processing device according to claim 2, wherein the internal diameters of the adapter tubes are adjusted by the thickness of the tubular body.

9. The coin processing device according to claim 2, wherein the adapter tubes have a plurality of ribs which protrude from the external surface of the tubular body along the longitudinal direction.

10. The coin processing device according to claim 9, wherein the internal diameters of the adapter tubes are adjusted by the thickness of the ribs or by the thickness of the tubular body.

11. The coin processing device according to claim 3, wherein the adapter tubes have a plurality of ribs which protrude from the external surface of the tubular body along the longitudinal direction.

12. The coin processing device according to claim 11, wherein the internal diameters of the adapter tubes are adjusted by the thickness of the ribs or by the thickness of the tubular body.

* * * * *